March 22, 1966   F. A. SCHWEIGER ET AL   3,241,842
SEALING MEANS WITH COOLING FLUID MEANS
Original Filed Dec. 19, 1962
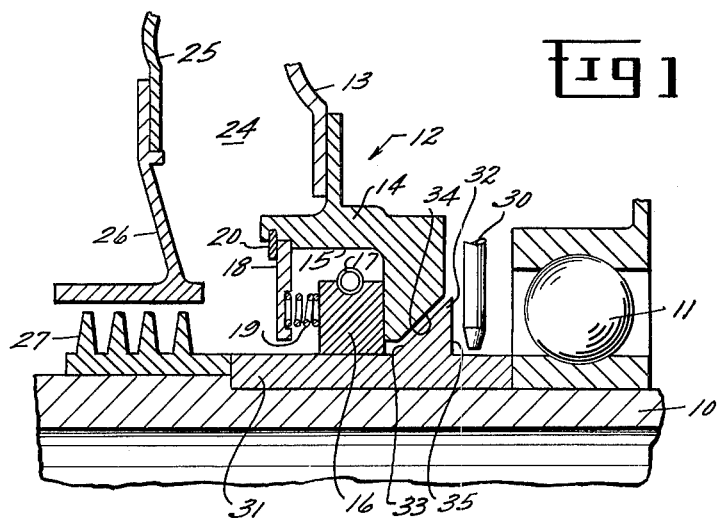
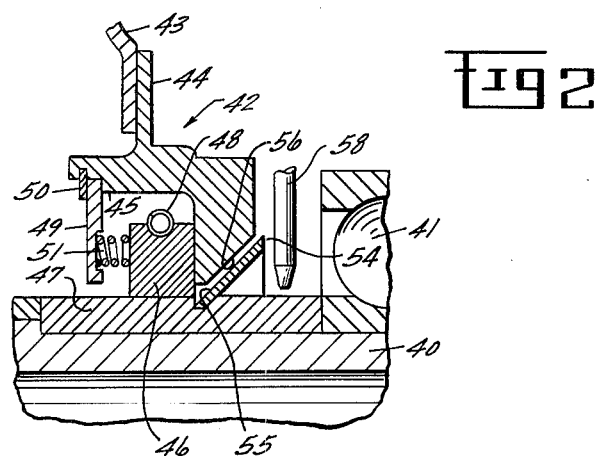
INVENTORS,
FRANK A. SCHWEIGER
ADAM N. POPE
BY
gerald L Moore
ATTORNEY

United States Patent Office 3,241,842
Patented Mar. 22, 1966

3,241,842
SEALING MEANS WITH COOLING FLUID MEANS
Frank A. Schweiger, Cincinnati, Ohio, and Adam N. Pope, Warminster, Pa., assignors to General Electric Company, a corporation of New York
Continuation of application Ser. No. 245,868, Dec. 19, 1962. This application Mar. 31, 1965, Ser. No. 445,867
2 Claims. (Cl. 277—22)

The present application is a continuation of my co-pending application, Serial No. 245,868, filed December 19, 1962.

This invention relates to a sealing means and more particularly to a seal for preventing fluid flow along a shaft passing through a wall member.

Frequently it is necessary to seal around a rotating shaft passing through a wall member to prevent fluid passage along the shaft. However where the fluid pressures are quite high on one side of the shaft or where the seal is subjected to high temperatures as in turbomachines, it is extremely difficult to provide a seal which is simple in construction and yet provides a long useful life so as to be relatively maintenance free. The problems of sealing are further amplified in high temperature applications since there must be provided a means for cooling the seal such as a cooling fluid jet or other means directed close to the seal to prevent seal overheating. However such a fluid jet, while serving a necessary cooling function, amplifies the problem of sealing since it causes a pressured fluid to be directed at or near the seal.

It is therefore one object of this invention to provide an improved sealing means for sealing around a rotating shaft.

It is a further object of this invention to provide a sealing means for use with a cooling fluid jet or other cooling fluid means which utilizes corresponding tapered surfaces on the seal support and rotating member for better sealing against fluid flow through the seal.

In accordance with one embodiment of the invention, there is provided a seal casing supported adjacent the rotating member providing a housing for supporting a seal member such as a spring loaded carbon seal contacting the rotating member, a tapered surface on the seal casing extends radially outward from the contact between the seal and rotating member with a ring member on the rotating member having a corresponding tapered surface adjacent and substantially parallel to that of the seal casing such that a cooling fluid jet may be directed at the rotating member on the opposite side of the ring member from the seal with the ring member preventing direct fluid splashing into the sealing surfaces while the tapered surfaces by centrifugal force pump any fluid away from the seal.

Other objects and many of the attendant advantages of this invention will be readily appreciated as the same becomes better understood by reference to the following detailed description when considered in connection with the accompanying drawings wherein:

FIG. 1 is a cross-sectional view of one embodiment of the subject invention,

FIG. 2 is a cross-sectional view of a second embodiment of the subject invention.

Referring now to FIG. 1, therein is illustrated a rotatable shaft 10 supported by a bearing 11. In most applications the bearing is located within a sump or lubricating fluid chamber for both lubricating and cooling the bearing. It is therefore necessary to provide a seal assembly 12 around the shaft where the shaft passes through a sump wall 13 to prevent leakage of lubricating fluid along the shaft. To accomplish this a seal support 14 is positioned around the opening in the sump wall through which the shaft passes which includes a means to support a seal therein to contact the rotating shaft, in this embodiment a seal 16 is supported in the cut-out portion 15. The seal 16 may be of any general type with one type being a segmented carbon seal made up of arcuate segments held against the rotating shaft by a spring 17 to form a sealing surface or juncture with a ring member 18 mounted in the casing which by action of a spring 19 presses the seal segment 16 against the casing wall. A split ring 20 is provided to retain the ring member 18 within the seal casing. By the spring 19 pressing the seal 16 against the casing wall and the spring 17 pressing the seal against the rotating shaft effective sealing is provided between the seal support 14 and the shaft 10. To further aid the seal and, where appropriate, to purge the area of hot gases a pressure chamber 24 may be provided, formed in part by a wall member 25 and the sump wall 13 with a stationary gas seal member 26 supported from the wall 25 with a labyrinth 27 mounted on the rotating shaft 10, seals against gas passing between the wall 25 and the rotating shaft 10. In this manner pressured gas may be introduced into the chamber 24 to pressurize the low pressure side of the seal assembly or that side of the seal opposite the sump and therefore assist in preventing fluid flow from the sump along the rotating shaft. Any gas leakage from the chamber 24 through the seal 12 may thereafter serve to prevent fluid flow through the seal in the opposite direction along the shaft 10 and may further be a controlled flow to pressurize the sump itself.

A cooling fluid jet 30 may also be provided to cool the seal to prevent damage thereto by overheating. Cooling fluid or lubricating fluid is forced through this jet to impinge against the rotating shaft, or in this case to impinge against a seal race 31 fitting around the rotating shaft 10 to cool the seal. However, the high pressure fluid passing from the jet 30 may result in excessive splashing or higher pressured fluid encountering the seal thereby amplifying the sealing problems. To counteract this a tapered or chamfered ring member 32 is provided which in this embodiment comprises a radial extension of the seal race 31 having a tapered surface 33 paralleling and adjacent to a similar tapered or chamfered surface 34 on the seal support 14. It may be seen that the cooling fluid passing from the jet 30 is thereby prevented from splashing directly on the seal by the wall 35 of the ring member 32 and any cooling fluid which passes between the tapered surfaces 33 and 34 is acted upon by centrifugal force to be pumped radially outward and away from the sealing surfaces. Further, the wall 35 and the annular surface of member 31 presents a much larger area against which the cooling fluid jet may impinge for more effective cooling of the associated parts.

Referring now to FIG. 2 therein is illustrated a second embodiment of the invention wherein a rotating shaft 40 is supported by bearing 41 with a seal assembly 42 utilized to seal around the shaft where it passes through a wall member 43. The seal assembly 42 comprises a seal support casing 44 having a cut-out portion 45 in which the seal member 46 is supported by close contact with a seal race 47 extending around the rotating shaft 40. A spring member 48 extends around the seal member 46 to bias the seal member against the race 47. A ring member 49 held in place in the casing 44 by split ring 50 serves to bias the seal 46 against the wall of the seal support casing by means of a spring 51 to further effect sealing between the seal casing and the rotating shaft assembly.

A truncated cone shaped annular member 54 is supported from the seal race 47 in a manner to present a tapered surface 55 in close association with a tapered surface 56 on the seal support casing 44. In the same manner as in the previous embodiment a cooling fluid jet 58 may be provided for cooling the seal assembly 42 with the member 54 preventing direct splashing on the seal assembly while the tapered surfaces 55 and 56 serve to prevent fluid from reaching the sealing surfaces by centrifugal force. It may be seen that this embodiment as well as the first embodiment presents distinct advantages in providing an effective sealing means around the rotating shaft. It should be understood however that in certain applications it would be possible to utilize this sealing assembly wherein the seal casing assembly might rotate and the shaft remain stationary or both rotate at different relative rotational speeds with the same beneficial sealing advantages. Further, while this seal assembly is described with a cooling jet assembly, it is equally effective in preventing normal fluid flow between any similar members as explained here, with or without a cooling fluid jet.

While particular embodiments of the invention have been illustrated and described, it will be obvious to those skilled in the art that various changes and modifications may be made without departing from the invention and it is intended to cover in the appended claims all such changes and modifications that come within the true spirit and scope of the invention.

What is claimed as new and desired to be secured by Letters Patent of the United States is:

1. A seal assembly preventing leakage between a relatively rotatable shaft and a sump wall,
    said assembly comprising
    an outer seal support attached to the sump wall and having a generally radial annular sealing surface at the outside of the sump wall,
    a seal race telescoped over said shaft and having a circumferential sealing surface,
    an annular seal yieldingly engaging said sealing surfaces to prevent leakage therepast,
    said race having an integral, raised ring member projecting therefrom interiorly of the sump wall side of said sealing surfaces,
    said outer support and said ring member having closely spaced, opposed annular pumping surfaces angled outwardly and away from said sealing surfaces from a point adjacent thereto, and
    means for projecting coolant fluid against said race at at point beyond the pumping surfaces and adjacent said ring member,
    whereby heat caused by engagement of said seal with the race sealing surface will be drawn into said ring member and dissipated by said coolant as it contacts said race and the ring member thereof, with the pumping surfaces minimizing any build-up of coolant pressure at the sealing surfaces.

2. A seal assembly in claim 1 wherein
    the ring member is triangular in cross section, the pumping surface thereof is conical and extends beyond the pumping surface of the outer seal support and terminates at an inwardly extending annular surface disposed in a plane normal to the shaft axis.

References Cited by the Examiner

UNITED STATES PATENTS

| | | | |
|---|---|---|---|
| 1,918,988 | 7/1933 | Searles et al. | 277—133 X |
| 2,621,087 | 12/1952 | Kluge | 277—144 X |
| 2,956,824 | 10/1960 | Kuchler et al. | 277—22 |
| 2,992,842 | 7/1961 | Shevchenko et al. | 277—74 X |
| 3,085,838 | 4/1963 | Patterson | 308—187 |

FOREIGN PATENTS

| | | |
|---|---|---|
| 1,026,133 | 3/1958 | Germany. |
| 662,150 | 12/1951 | Great Britain. |

LAVERNE D. GEIGER, *Primary Examiner.*

SAMUEL ROTHBERG, *Examiner.*